UNITED STATES PATENT OFFICE.

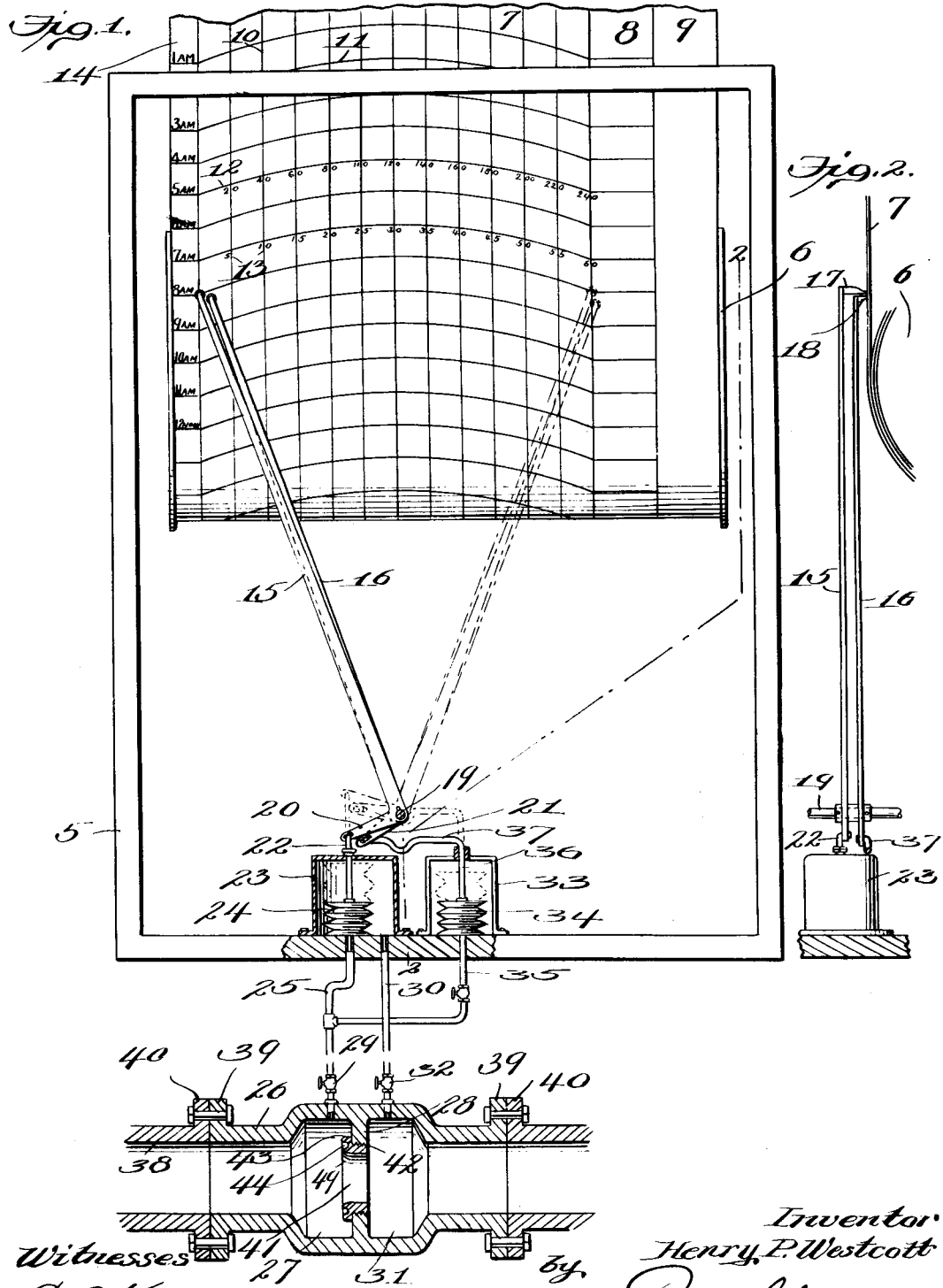

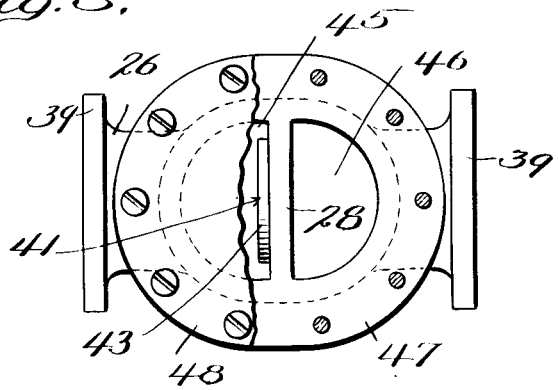
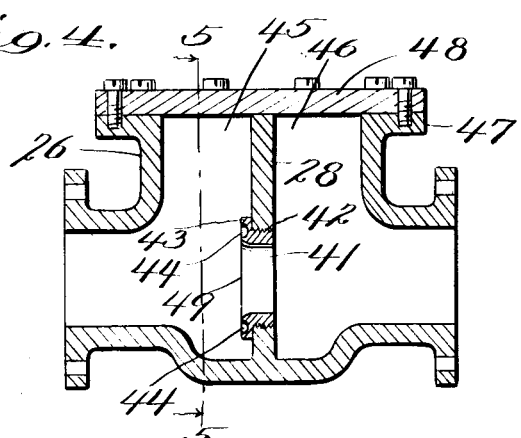
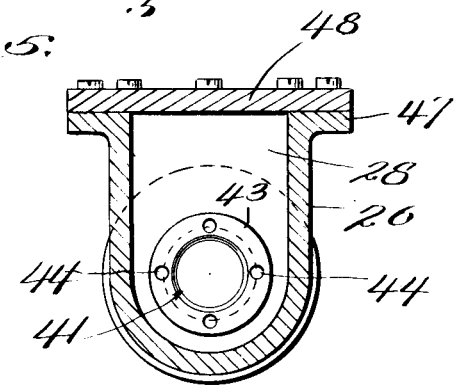

HENRY P. WESTCOTT, OF ERIE, PENNSYLVANIA.

GAS-VOLUME-MEASURING APPARATUS.

1,172,087. Specification of Letters Patent. Patented Feb. 15, 1916.

Application filed March 4, 1915. Serial No. 12,031.

*To all whom it may concern:*

Be it known that I, HENRY P. WESTCOTT, a citizen of the United States, residing at Erie, in the county of Erie and State of Pennsylvania, have invented new and useful Improvements in Gas-Volume-Measuring Apparatus, of which the following is a specification.

This invention relates to the measurement of gas, and the primary object of the invention is to provide novel means whereby the volume of flowing gas may be accurately determined.

The invention contemplates not only an improvement in the meter itself but in a specially devised recording gage, the meter being of the orifice type and associated with the gage in such manner that the latter is dependent on the former for operation and embodies a novel arrangement of two marking arms operatively connected to the orifice meter, one arm recording the static pressure with black ink or by other distinguishing means, and the other arm recording the differential pressure with red ink or other marking material, both arms coöperating with a single chart, and as a further distinguishing convenience, the chart will have the pressure figures printed thereon in ink or of a color corresponding to that used in the pressure marking arm, and the differential pressure figures are likewise to be printed in ink or of a color corresponding to that used in connection with the differential recording marking arm. Each gage is so adjusted or calibrated that one set of lines marking the pressure pounds or inches of water can be used for both, or, in other words, the inches of water lines will be identical with the pressure lines. The two marking arms have a movement across the chart and are arranged to pass one another without interference, the chart being provided with practically two scales or two sets of figures, and the marking arms are connected up in such manner relatively to the chart and to the orifice meter that the records of the arms as indicated on the chart will be of a positive and very accurate character and provide a basis from which a ready calculation can be made by means of well known formulas, or reference may be had with relation to preliminarily prepared calculated information relatively to different co-efficients and other matter incident to the operation of an orifice meter and a recording gage. The present invention also contemplates the use of a very convenient form of orifice plate which may be readily removed from the casting and replaced by another orifice plate as may be desired and found necessary, the orifice plate being of such character that it may be readily transmitted from one point to another for a test as to accuracy, and by this means the volume desired to be measured in a certain size pipe line may be readily ascertained. The present form of orifice or orifice meter is generally organized to facilitate the introduction thereof in a pipe line without putting any strain on the pipe line or spreading the latter, and after the meter casting has been once disposed in the line it is unnecessary to detach the same but to remove the orifice plate instead which is permitted by reason of a particular construction which will be more fully hereinafter specified.

An embodiment of the complete apparatus involving the interdependent parts is disclosed in the accompanying drawings in one practical form, and in these drawings: Figure 1 discloses a sectional elevation of an orifice meter or orifice and recording gage embodying the features of the invention. Fig. 2 is a sectional elevation taken in the plane of the line 2—2, Fig. 1. Fig. 3 is a top plan view, partially broken away, of an orifice meter embodying a portion of the features of the invention. Fig. 4 is a longitudinal vertical section of the meter arrangement as shown by Fig. 3. Fig. 5 is a transverse vertical section taken in the plane of the line 5—5, Fig. 4.

The numeral 5 designates a gage casing of suitable dimensions and having a roller or reel 6 mounted therein and operated, as usual in gages, by suitable clock mechanism to regularly rotate the same, the roller or reel 6 having a chart 7 wound thereon and movable therefrom as will be readily understood. This chart 7 has on the right side two columns 8 and 9 arranged to give hourly and daily readings. The chart is also divided into regular spaces by longitudinal and arcuate lines 10 and 11 and thereon are scale figures 12 and 13 respectively, designating the static pressure pounds per square inch and the differential pressure in inches of water, the scale numerals 12 being in the present instance printed in black and the numerals 13 in red. At the left of the chart is a time column 14. The chart is in the form of a tape and moves longitudinally, and the arcuate division lines 11 correspond to the arcuate movements of recording arms which will be hereinafter specified. In the present instance the chart is divided to measure 240 pounds in units of twenty and is also calibrated to indicate the inches of water by the numerals 5, 10, 15, etc., the lines indicating the inches of water being identical with the pressure lines. The hourly readings given in the column 8 are, according to the pressure as calculated by a well known formula in cubic feet, past the meter per hour, and in the next column 9 the hourly readings can be footed up for a twenty-four hour period and change the daily readings of the meter. The chart or the recording tape 7 is to be long enough to last for a thirty-day period in coöperation with an eight-day clock. Movable over the chart 7 as the latter progresses through the actuation thereof by the clock mechanism are two recording arms 15 and 16, the recording arm 15 registering the differential on the chart and the arm 16 the static pressure. The arm 15 has a suitable marking finger or pen attachment 17 filled with red ink or other distinguishing marking material, and the arm 16 has a marking extremity or pen attachment 18 supplied with black ink or any other suitable marking material, and the scale numerals on the chart or tape 7 are also of the same color or character as the inks of the two marking arms so that the arms may simultaneously record on the chart the differential and static pressures in a positively distinguishing manner to facilitate an expeditious reading of the record and a calculation as to the volume relatively to the co-efficient of the orifice plate in the orifice meter. The arms 15 and 16 are so mounted that the arm 15 may readily pass the arm 16 and both arms are held on a suitably supported fulcrum rod or spindle 19 disposed within the lower portion of the casing 5, as shown. The lower end of the marking arm 15 has an angle foot or member 20 and likewise the lower end of the arm 16 is provided with an angle foot or member 21. The angle foot or member 20 is connected to the upper end of a rod 22 extending into a pressure-tight casing 23 and attached to and actuated by a diaphragm pressure tube 24 having a small pipe 25 opening thereinto and extending downwardly to the orifice meter casing or casting 26 and communicating, as shown, with the interior chamber 27 on the left of the orifice division means or partition 28, the pipe 25 having a suitable valve 29 therein to control the flow of the gas therethrough. The pressure-tight casing 23 also has a pipe 30 opening thereinto exteriorly of the diaphragm pressure tube 14 and also connecting with a chamber 31 on the right of the orifice division means or partition 28. The pipe 30 is provided with a suitable valve 32 to control the flow therethrough as will be understood. Adjacent to the pressure-tight casing 23 is another similar casing 33 and therein is mounted a diaphragm pressure tube 34 having a pipe 35 opening into the lower portion thereof and connecting with the pipe 25 which is in communication with the chamber 27 on the left side of the orifice division means or partition 28. The pressure tube 34 also has a rod 36 secured thereto and movable upwardly through the top of the casing 33, said rod being bent at an angle, as at 37, and connected to the free end of the angle foot or member 21 of the marking arm 16. The rods 22 and 36 have free movement vertically relatively to the casings in which they are mounted or are very sensitive in their response to the movements of the pressure tubes 24 and 34, and both marking arms 15 and 16 are loosely mounted on their fulcrum means or shaft 19, and it will be seen that a slight actuation of the members 20 and 21 will result in a material swing of the marking arms relatively to the chart 7. The organization of the two marking arms 15 and 16 in connection with the single fulcrum means or shaft 19 and connected to the rods 22 and 36 actuated by the pressure tubes 24 and 34 is a very unique and advantageous arrangement, and the differential and static pressures will be reliably recorded without lost motion to any appreciable or disadvantageous degree.

It will be understood that the two pressure-actuated devices, including the casings 23 and 33, the pressure tubes 24 and 34, and the rods 22 and 36, serve as pressure-actuated intermediaries between the two marking arms 15 and 16 and the orifice meter, the latter being connected up to the said intermediaries by the pipes 25, 30 and 35, and, therefore, the said intermediaries are not obvious adjunctives but present a novel correlation to the orifice meter and the marking arms 15 and 16 whereby the said arms are caused to move across the chart or tape 7 in making their records at the same time that the tape is moving longitudinally, and the elimination of separate or the usual independent recording gages is not only accomplished, but the operating mechanism for the recording arms is so condensed as to give the latter a practical efficiency and positive operation relatively to the pressures in the orifice meter.

The casing or casting 26 is introduced into the pipe line 38 without unflanging any flanges in the pipe line, the opposite extremities of the casing or casting 26 being provided with flanges 39 which are bolted or otherwise detachably secured to the flanges 40 of the pipe line, as clearly shown by Fig. 1, and by this means the orifice meter may be installed in the pipe line without imposing any strain on or spreading said pipe line. The detachable feature of this meter is very advantageous in view of the methods as commonly employed in this particular art, and another strong advantage in the present orifice meter construction is the separable association with the division means or partition 28 of the orifice jet or member 41, the latter being screw-threaded into the said division means or partition 28, as at 42, and having an abutting flange 43 at one side with spanner or wrench openings 44 therein to facilitate the removal and application of the orifice jet. The pipes 25 and 30 connect with the side portion of the meter and the top is formed with openings 45 and 46 surrounded by a broad flange 47 on which a cover 48 is removably mounted, the orifice jet being readily inserted in the chamber 27, for instance, and secured in position in the division means or partition 28 or detached and removed from said chamber without disturbing the casting or casing 26. This removable characteristic of the orifice jet is a very important feature of the present invention in view of the fact that the same may be removed and mailed to the factory for a test for accuracy, or another size of orifice jet can be substituted for one that has been previously used in accordance with the volume desired to be measured in a certain pipe line. The inlet side 49 of the jet orifice is slightly tapered and by such construction vibration on the differential gage caused by counter-currents will be materially minimized.

From the foregoing description of the construction and arrangement of the several parts of the meter organization, including the gage, it will be observed, first, that the marking arms 15 and 16 are both mounted to swing on the same center or fulcrum and have lower angular extremities that are directly connected to or controlled by the pressure tubes 24 and 34, and there will be practically a direct action without mechanical loss between the orifice meter and the marking arms, with the result that a reliable record will be produced upon the chart or tape 7. From the foregoing also the operation of the device will be readily understood and, briefly, the pressure taken from the chambers 27 and 31 through the pipes 25 and 30 into the pressure-tight casing 23 will give the differential pressure record in inches of water, and through the medium of the pipe 35 connecting with the pipe 25 and with the pressure tube 34 the marking arm 16 will give the static pressure record in pounds per square inch, and having the two records thus clearly and positively defined on the chart or tape 7 the volume of flow through the pipe line may be readily determined, and, furthermore, an orifice jet may be used as found necessary or depending upon the volume desired to be measured. In view of these conveniences in ascertaining the results sought, the calculations relatively to some prepared scale, in view of the co-efficient or approximate co-efficient of the orifice jet, may be easily ascertained by methods which are well understood in the art. It will also be understood that the gage, as hereinbefore disclosed, records differential and static pressures incident to the sudden drop in pressure between two sides of the orifice jet, the pressure being taken from both sides of the division means or partition 28 or from opposite sides of the orifice jet 41 from the chambers 27 and 31 and the difference recorded in inches of water pressure. As the volume increases, the drop in pressure between the differential and the two sides of the plate increases and, consequently, with the assistance of the static pressure record and the differential pressure record, the volume of gas passing through the pipe line may be readily calculated.

What is claimed is:—

1. In a gas volume measuring apparatus, the combination of an orifice meter, a recording gage comprising a longitudinally movable chart, a pair of marking arms movable transversely with relation to and over the chart, the arms being provided with a common fulcrum and one arm movable past the other over the chart, and pressure means interposed independently coöperating with the arms and between the said arms and communicating with the orifice meter on opposite sides of the orifice thereof for operating the said arms.

2. In a gas volume measuring apparatus, an orifice meter having a jet orifice therein, a chart mounted to move longitudinally, a pair of marking arms movable transversely over the chart, the arms having a common fulcrum and one movable past the other over the chart, air-tight casings having pressure tubes independently connected to the said marking arms for individually operating the latter to record differential and static pressures on the same chart, and pipe connections communicating with the meter on opposite sides of the jet orifice and also with the pressure tubes and one of the casings.

3. In a gas volume measuring apparatus, the combination of a longitudinally shiftable chart having distinctive scales thereon to indicate static pressure pounds per square inch and differential pressure in inches of water, a pair of marking arms loosely mounted to simultaneously operate with and shift transversely across the said chart to record static and differential pressures, the one arm being movable past the other over the chart, an orifice meter having an orifice jet therein, air-tight casings having pressure devices therein independently connected to the said arms, and pipe connections between the orifice meter on opposite sides of the jet orifice and the said pressure devices and one of the casings.

4. In a gas volume measuring apparatus, the combination of a longitudinally shiftable chart having scale marks thereon to indicate static pressure pounds per square inch and differential pressure in inches of water, a pair of independently movable marking arms shiftable transversely over the chart and held by a fulcrum means common to both, the one arm being shiftable past the other in opposite directions, an orifice meter having a jet orifice therein, movable pressure devices independently connected to the arms, and pipes between the orifice meter on opposite sides of the orifice jet and the pressure devices to operate said marking arms for recording differential and static pressures on the chart.

5. In a gas volume measuring apparatus, a longitudinally movable chart having scale marks thereon in distinctive shades indicating static pressure pounds per square inch and differential pressure in inches of water, a pair of marking arms shiftable transversely over the chart and independently operative so that one will move past and under the other and also having marking means corresponding in shade to the said scale marks, an orifice meter having a jet orifice therein, pipe connections from opposite sides of the jet orifice of the orifice meter, and pressure devices with which the pipe connections communicate, said devices being independently attached to the marking arms.

6. In a gas volume measuring apparatus, an orifice meter having a fixed partition therein forming opposite chambers and provided with a screw-threaded opening and also with a removable cover to expose the said chambers, the chambers having communication solely through the said opening, and a jet-orifice having a screw-threaded association with the said opening and readily removable from and replaceable in relation to the partition means and the opening in the latter and withdrawable and insertible through the top of the orifice meter without disturbing the association of the latter with the pipe line, the jet orifice having a slightly tapered wall at its inlet portion, and recording mechanism connected to the meter.

7. The combination with a pipe line, of an orifice meter casing detachably connected thereto and having a fixed partition therein provided with a screw-threaded opening, the partition forming chambers on opposite sides thereof and the casing being provided with openings and normally having a cover thereover, a jet orifice removably screw-threaded in the opening of the partition and withdrawable upwardly and insertible downwardly through the top of the casing, the chambers having communication solely through the jet orifice, and means connected to the orifice meter on opposite sides of the fixed partition of the latter for recording through the medium of differential and static pressure the volume of gas flowing through the pipe line.

In testimony whereof I have hereunto set my hand in presence of two subscribing witnesses.

HENRY P. WESTCOTT.

Witnesses:
R. G. SOPER,
C. DENNES.